(12) United States Patent
Glasspool

(10) Patent No.: US 7,505,926 B2
(45) Date of Patent: Mar. 17, 2009

(54) METHODS, APPARATUS, AND COMPUTER READABLE MEDIUM FOR PROCESSING BIDS IN AN AUCTION

(75) Inventor: Andrew Glasspool, Surrey (GB)

(73) Assignee: Sit-Up Limited, London (GB)

( * ) Notice: Subject to any disclaimer, the term of this patent is extended or adjusted under 35 U.S.C. 154(b) by 683 days.

(21) Appl. No.: 10/490,533

(22) PCT Filed: Sep. 27, 2002

(86) PCT No.: PCT/GB02/04353

§ 371 (c)(1),
(2), (4) Date: Nov. 3, 2004

(87) PCT Pub. No.: WO03/030041

PCT Pub. Date: Apr. 10, 2003

(65) Prior Publication Data

US 2005/0080707 A1    Apr. 14, 2005

(30) Foreign Application Priority Data

Oct. 1, 2001   (WO) ................... PCT/GB01/04367
Oct. 31, 2001  (GB) ............................. 0126127.0

(51) Int. Cl.
*G06Q 30/00*   (2006.01)
*G06F 17/30*   (2006.01)

(52) U.S. Cl. ............................ 705/26; 705/27; 705/37

(58) Field of Classification Search ............ 705/26–27, 705/37
See application file for complete search history.

(56) References Cited

U.S. PATENT DOCUMENTS

| | | | | |
|---|---|---|---|---|
| 5,835,896 A | * | 11/1998 | Fisher et al. ................... | 705/37 |
| 5,905,975 A | * | 5/1999 | Ausubel ....................... | 705/37 |
| 6,321,207 B1 | * | 11/2001 | Ye ................................ | 705/8 |
| 6,373,929 B1 | * | 4/2002 | Johnson et al. ......... | 379/114.02 |
| 2001/0032175 A1 | * | 10/2001 | Holden et al. ................. | 705/37 |
| 2001/0037278 A1 | * | 11/2001 | Messmer et al. .............. | 705/37 |
| 2002/0007338 A1 | * | 1/2002 | Do .............................. | 705/37 |
| 2002/0007339 A1 | * | 1/2002 | Hogendoorn ................ | 705/37 |
| 2002/0082980 A1 | * | 6/2002 | Dinwoodie .................. | 705/37 |
| 2003/0041010 A1 | * | 2/2003 | Yonao-Cowan .............. | 705/37 |

FOREIGN PATENT DOCUMENTS

WO   WO02/28082 A1   4/2002
WO   WO03/005273 A1  1/2003

OTHER PUBLICATIONS

Accelerating Information Revelation in Ascending-Bid Auctions—Avoiding Last Minute Bidding—. Shigeo Matsubara. Oct. 2001. NTT Communication Science Laboratories, NTT Corporation. [recovered from Dialog database on Apr. 30, 2008].*
http://www.sit-up.tv, Nov. 2000.
http://www.bid-up.tv, Nov. 2000.

* cited by examiner

*Primary Examiner*—Jeffrey A. Smith
*Assistant Examiner*—William J. Allen
(74) *Attorney, Agent, or Firm*—Blakely Sokoloff Taylor & Zafman LLP

(57) ABSTRACT

The invention is generally, but not exclusively, related to the area of interactive auctions, particularly interactive Internet-based auctions that may be simultaneously televised and where bidders may input bids over channels other than the Internet.

51 Claims, 5 Drawing Sheets

METHODS, APPARATUS, AND COMPUTER READABLE MEDIUM FOR PROCESSING BIDS IN AN AUCTION

The present patent application is a non-provisional application of International Application No. PCT/GB02/04353, filed Sep. 27, 2002, which claims priority from GB 0126127.0 filed Oct. 31, 2001 and PCT/GB01/04367 filed Oct. 1, 2001, which are herein incorporated by reference.

The invention is generally, but not exclusively, related to the area of interactive auctions, particularly interactive Internet-based auctions that may be simultaneously televised and where bidders may input bids over channels other than the Internet.

One problem associated with applying prior art auction systems to interactive auctions is that large numbers of bids must be processed in a short space of time for the auction output to be broadcast in real time. Many prior art Internet-based auctions take place over a long period of time, for example over several hours or several days, and the bid frequency is very low, so the problems are no so critical. However, for an interactive auction that takes place in a short space of time, for example an auction that is simultaneously being televised, there may be a high bid frequency and, in addition, the information output by the auction system, such as the current highest bid and the minimum bid required, must be updated as quickly as possible. Only a fast update of the status of the auction will allow viewers (for example, on the Internet or television) to interact with the process in real time.

A further problem associated with prior art auction systems is that a large number of bids are entered into the auction by each bidder during the course of the auction. This problem may be exacerbated by the use of proxy bidders or automatic bidding agents. Proxy bids have been used in conventional auctions and an automatic bidding agent is a known feature of prior art automated auction systems, particularly of Internet-based auction systems which take place over a long period of time when the bidder is unlikely to be online. Bidders may deploy an automatic bidding agent to monitor the status of the auction and to make bids, increasing the bid value as necessary up to a pre-defined maximum amount. This allows the bidder to be offline during the auction itself. However, each automatic bidding agent may enter many bids on behalf of a bidder in order to ensure that the auction item is obtained for the lowest possible price and so this system contributes to generating a large number of bids per bidder, most of which will be losing bids. Both the generation of bids by running of the bid agents and the processing of bids contributes to load on the system.

The need to process large numbers of bids quickly enough to provide real time feedback to bidders and update the list of current winners and the increased load on the system due to automatic bidding agents inputting a large number of bids per bidder mean that it is problematic to implement a large real time automated auction using prior art auction systems.

The present invention aims to provide a data processing system to process received bids as quickly as possible in order to facilitate real time interactive auctions and, in a further preferred embodiment, aims to reduce the load imposed by proxy bids on the infrastructure of the bidding system.

Aspects of the invention are set out in the claims below and preferred features are set out in the dependent claims to which reference should be made. Preferred features of each aspect may be applied to other aspects unless otherwise expressly stated.

According to a first aspect, the invention provides a method of data processing for processing bids in an auction, the auction having a live phase during which bids are accepted and an auction close following which bids are no longer accepted, the method comprising:

receiving at least one bid for an item in an auction;
assigning a time stamp to the or each bid received;
storing data comprising a bidder identity, the time stamp and the bid amount;
preprocessing the or each bid to obtain auction status information during the live phase of the auction;
subsequently processing the stored data to determine at least one winning bid.

Preferably, at least a portion of the subsequent processing is carried out after the auction close. Processing each received bid in two stages may allow the bid information to enter the auction output more quickly which is advantageous in, for example, a live televised and/or Internet-based auction, where auction status information needs to be updated quickly so that bidders can participate in the auction in real time. The time stamp assigned to each bid may allow the order of receipt of a plurality of bids to be identified during later processing of the bids. This may provide a particular advantage when bids for the auction are received over more than one channel, for example, when some bids are received over the Internet and other bids are received over a telephone network.

Preferably, the auction status information includes at least one of:

a minimum required bid amount;
a current maximum bid amount;
a value or values for the or each winning bid.

In a preferred implementation, the method may include identifying a plurality of winning bids, for example, if there are multiple similar items to be auctioned. The auction status information produced is useful to the auction system in determining whether new incoming bids are winning bids. The information may also be provided to bidders, as described in more detail below, so that they may interact with the auction and follow its progress.

Preferably, the auction status information is used in the pre-processing of at least one received bid, which preferably comprises:

receiving a bid;
determining whether the value of the received bid makes it a winning bid preferably based on a minimum required bid amount;
the method may include updating the auction status information in dependence on the determination.

Such a pre-processing stage may extract information necessary for the bid to enter into the auction output as quickly as possible.

Preferably, data for the or each bid is output to a persistent store or database (e.g. on a hard disk, tape or flash memory, or other non-volatile, typically lower speed, medium) that holds information relating to all the bids for a particular auction.

Preferably, at least part of the outputting is performed in the subsequent processing stage; this may reduce demand during the live phase as live information may be retained in faster volatile memory, e.g. DRAM. The persistent store of data may provide all of the bidding information for the auction and allows the "live" auction to be recreated at any time.

Preferably, at least one of the bids received is designated a maximum value bid wherein a maximum purchase price is specified and a bid value is determined in response to other bids. This may allow the or each bidder to enter only one bid into the auction rather than entering a series of bids as the auction price rises which may reduce the load on the auction input system enabling a bidder to "participate" without being present.

Preferably, for maximum value bids, the maximum bid value is stored, but simulated proxy bids generated for the maximum value bid are not all stored. More preferably, only the maximum bid value is stored. This may allow fewer entries to be stored or written to the persistent store during the auction which may release the resources of the auction system to process incoming bids more quickly and to run the auction output.

More preferably, for at least one maximum value bid, the pre-processing step is performed without determining the bid value. At the pre-processing stage, preferably it is determined whether the maximum value of an incoming maximum value bid is greater than or equal to the minimum required bid amount without assigning a bid value. Again, this may speed up the process of entering the bid into the auction and updating the auction status information.

More preferably, the subsequent processing step comprises assigning bid values to all winning maximum value bids, optionally to all maximum value bids. This enables the winning bids to be determined.

Preferably, the maximum value bids are processed in accordance with a predetermined algorithm.

Preferably, the predetermined algorithm includes at least one rule for distinguishing between equal value bids based on at least one objective criterion.

Preferably, fixed value bids are processed at a higher priority than maximum value bids. This ensures that live bidders are given preferential treatment to "invisible" bids generated by the system.

Preferably, maximum value bids received earlier are processed preferentially compared to maximum value bids received later.

A further highly preferable feature is that, for an auction having a first plurality (n) of sale items and a second plurality (m) of valid maximum value bids with maximum values greater than a current minimum acceptable bid, a required bid value for an incoming bid is determined based on the number of sale items remaining (n−m) after disregarding a number of items (m) corresponding to said second plurality of valid maximum value bids. Hence items may effectively be taken out of the auction process and assigned temporarily to the current winners who hold maximum value bids. This may again increase the running speed of the auction system, as the minimum acceptable bid price may be determined by examining the current winning bid prices of fewer items.

Preferably, if the number (l) of received maximum value bids is greater than the number (n) of sale items, pre-processing includes setting a minimum valid bid value and rejecting excess maximum value bids to leave a number (m*) of valid maximum value bids at most equal to the number (n) of sale items. This may allow the minimum acceptable bid price to be increased in order to disregard the number (l−n) of losing maximum value bids.

A further preferable feature is that the auction status information is incorporated into an auction output. As discussed above, this is advantageous since it allows greater interactivity between the bidders and the auction itself. Bidders can monitor the progress of the auction and input further bids when necessary if their original bids are not winning bids.

Preferably, at least one bid is received over the Internet. This may be implemented for example, by e-mail or in a live "chat room", and may allow close interaction between the bidders and the auction as well as faster submission of bids to the auction system. More preferably, the bidder identifier used for bids received over the Internet is a predefined Personal Identification number (PIN) entered by the bidder upon submitting the bid.

A further preferable feature is that at least one bid is received over the telephone network. Bids may be submitted, for example, using an SMS message or a voice call. This may provide an alternative bid submission method which may be used by those without Internet access or for whom using a telephone network may be more convenient.

More preferably the bidder identifier used for bids received over the telephone network is the Caller Line Identifier (CLI). This may be collected automatically by the auction system, which again increases the speed of the process to enter a bid into the auction.

Preferably, at least one bid is received over a first input channel and at least one bid is received over a second input channel. Preferably, one of those channels is the Internet. Preferably, one of the channels is a telephone network. This may allow bidders a choice of input channel, which may allow more bidders to participate in the auction.

More preferably, the time stamps for the or each bid received over the first channel and the time stamps for the or each bid received over the second channel are correlated. Since the time stamps are assigned to each bid upon receipt, this may allow full integration of bids received from different sources, even if, for example, full processing of a telephone bid takes longer than full processing of an Internet bid.

A second aspect provides a method of providing a persistent store of data for an interactive auction comprising:
  receiving at least one bid for one of the at least one items in an auction;
  storing an identifier corresponding to the or each bidder;
  storing a bid corresponding to the or each bidder identifier, wherein the value of at least one of the bids stored is a maximum purchase price;
  storing a time stamp for the or each bid to identify the time at which the or each bid was received.

Preferably, the at least one bid is received from a device that processes bids according to the first aspect or any of its preferable features. Hence the bid is received by the persistent store with an identifier of the time at which the bid entered the auction and a bidder identifier. Storing the bid data in a persistent store may also allow the at least one auction winner to be determined directly from this data at any time during or after the auction.

Preferably, the second aspect further provides a method of providing data stored in the persistent store to a system for incorporation in a simulated live auction. This may allow a more interactive auction process, with bidders able to observe how the bidding effectively progresses throughout the auction.

A preferable feature of both the first and second aspects of the invention is that the bidders are pre-registered users. This may allow faster processing of each bid so that it enters the auction more quickly and also provides easy identification of the bidder submitting the bid. Each bidder may use a predetermined personal identification number (PIN) as a bidder identifier, which may be input by the bidder when the bid is submitted. The PIN number may be defined by the bidder during the registration process.

Preferably, the pre-processing of bids further comprises simulating a bid value for at least one maximum value bid. Hence maximum value bids may not be entered into the auction at their full values, but at reduced values, which may be set just above the value necessary to enter a winning position.

A third aspect of the invention provides a method of simulating bidding in an auction of at least one item wherein bid data, including a bid value and a time stamp, is stored for each of a plurality of bids, the bid data including at least one maximum value bid specifying a maximum bid amount, the method comprising estimating a bid value for said at least one maximum value bid based on bid data for other bids and a predetermined algorithm. This may allow simulation or re-creation of bidding in a auction without the auction system having to process large numbers of bids from each bidder. In particular, storing maximum value bids for at least one bidder and determining what would have been bid based on the bid data may avoid an auction system having to process large numbers of proxy bids generated during a live auction on behalf of that bidder.

Preferably, the method of simulating bidding further comprises providing as live auction output at least one simulated proxy bid for at least one bidder having a designated maximum value bid at a value lower than the stored maximum value of the bidder's bid. This may make the auction appear more interactive, with the simulator providing effective bids for the proxy bidder without the auction processor having to deal with those proxy bids.

As for the first aspect, preferably, for maximum value bids, the maximum bid value is stored in a database of bids for use in determining a winner, but simulated proxy bids generated for the maximum value bid are not all stored in the database.

More preferably, only the maximum bid value is stored in the database. This may allow fewer entries to be stored or written to the persistent store during the auction which may release the resources of the auction system to process incoming bids more quickly and to run the auction output.

Preferably, the bid data is obtained from a persistent store that stores data according to the second aspect of the invention or any of its preferable features.

A further preferable feature is that the auction output includes auction status information which comprises at least one of:
the maximum bid amount;
the minimum acceptable bid;
the value of the at least one winning bid.

In one embodiment, the initial minimum acceptable bid amount may be set to the reserve price of the auction item. This may ensure that the at least one auction item is not sold for a purchase price lower than the reserve price of the item. Alternatively, the method may include inserting proxy bids until the reserve price is reached.

A further preferable feature of the third aspect is that, in an auction of a given number (n) of items, the value of the at least one current winning bid is determined by examining the database for the given number (n) of earliest highest bid(s). In this way, the current winning bid(s) may be determined at any time during the auction, or after its close.

More preferably, any of the given number (n) of earliest highest bid(s) that are maximum value bids are displayed as the current winning bid(s) at the value of one auction increment above the current minimum acceptable bid. This may encourage more bidders to take part in the auction by displaying the lowest value that the maximum value bids require to win.

Preferably, the method further comprises setting a minimum acceptable bid price for the or each item, as the auction progresses, to one bid increment above the value of the current lowest winning bid. This enables incoming bids to be rapidly processed to determine acceptability and if (preferably) the auction is output, may allow auction viewers and bidders to see at a glance the minimum required bid amount at any time during the auction.

Preferably, the simulated bidding is broadcast over at least one medium, such as television or the Internet.

More preferably, the simulated bidding is broadcast over two media with mutually different input/output interfaces. This may allow a large number of bidders and potential bidders to observe the progress of the simulated "live" auction in real time with different criteria or detail available depending on the medium.

Preferably, the method further comprises updating the value of the or each current winning bid and updating the minimum acceptable bid price according to further data received during the auction.

More preferably, the method further comprises updating the value of the or each current winning bid and updating the minimum acceptable bid price according to data stored in a persistent store. Hence bidders may be able to follow the auction in real time as it progresses. Both new bidders and existing bidders may be able to obtain the most up to date information regarding the status of the auction before submitting bids.

In a fourth aspect, the invention provides a data processing method for determining the purchase price of at least one item in an auction, the method comprising determining the price of at least one item purchased in the auction, following the close of the auction, using stored bid data.

A fifth independent aspect provides a data processing method for identifying at least one winner of an auction, the method comprising identifying at least one winning bidder, following the close of an auction, based on stored bid data.

Determining the at least one winning bidder in an auction and the purchase price of the at least one item from stored bid data may be advantageous, since it is not necessary to store data regarding the auction winners and the purchase price during the auction. In a prior art auction system, it would be necessary to store data regarding the current auction winner and the current purchase price each time a new bid is entered into the auction. This may reduce the speed at which the auction output can be generated.

Preferably, for the methods of either or both of the fourth and the fifth aspects, the bid data is obtained from a persistent store that stores data according to the second aspect of the invention or of its preferable features. The at least one auction winner and the purchase price of the at least one item may be determined from the stored data at any time during the auction or at the end of the auction.

Preferably, the process of determining the final winner may act independently of the process providing the auction output. This may permit the auction output process to operate more quickly, since it does not need to recalculate and store the identity of the winning bidder and a new purchase price for the item each time it receives a new bid.

Preferably, the value of at least one bid stored is set at the maximum purchase price acceptable to the bidder. More preferably, the purchase price of the at least one item is determined without first determining the values of intermediate proxy bids entered on behalf of bidders who submit bids with values corresponding to the maximum acceptable purchase price. This reduces the amount of processing required to determine the at least one auction winner. It also allows the identity of the at least one winner to be determined from the stored data, independently of the process simulating proxy bids for the bidder.

Preferably, the stored bid value and time stamp data for the or each bid is used to identify the at least one earliest highest bid and hence determine the at least one winner of the auction. This information is stored in the database of the persistent store and is therefore easily obtainable by the process which determines the at least one winner.

Preferably, the bid value and time stamp data for the or each bid is used to identify the highest losing bid in the auction. This may be used to set the purchase price paid by maximum value bidders for the at least one item.

Preferably, the purchase price for any winning bidder who input a fixed price bid is set at the value of the fixed price bid. Hence the purchase price for the fixed price winning bidder will be, as expected by the bidder, the same amount as was entered as the fixed price value.

A preferred embodiment of the fourth and fifth aspects may comprise:
identifying the at least one winning bidder from data stored in the database;
identifying the highest losing bid in the auction;
setting the maximum value bidder purchase price for the at least one item based on the value of the highest losing bid.

More preferably, the method further comprises:
determining whether the value of the highest losing bid is equal to the value of the lowest winning bid;
if the highest losing bid has the same value as the lowest winning bid, setting the maximum value bidder purchase price for the at least one item to the value of the highest losing bid;
if the highest losing bid has a value lower than that of the lowest winning bid, setting the maximum value bidder purchase price for the at least one item to one auction increment higher than the value of the highest losing bid.

This may help to ensure that bidders placing maximum value bids obtain the auction item for the lowest possible winning price.

A sixth aspect provides a method of providing a falling price auction comprising:
setting a bid value to an initial maximum amount;
receiving at least one indication to bid at a particular value for at least one item in an auction;
assigning at least one of a time stamp or a bid value to the at least one indication to bid;
storing data comprising the bidder identity and the time stamp or the value at which to input a bid;
subsequently processing the stored data to determine at least one winning bidder and the purchase price of the at least one item.

Preferably, at least a time stamp is attached to the or each indication to bid. This facilitates post processing of the bids and may enable priority to be given to indications to bid received earlier.

Preferably, auction data is processed according to the method of the first aspect of the invention. The same two-stage processing of incoming bids as used in the first aspect of the present invention may also be applied to a falling price auction. This brings similar advantages to the falling price auction system as it did to the rising price auction system, particularly with regard to the speed with which auction status information may be updated.

Preferably, the system that determines the at least one final auction winner and the purchase price of the item acts independently of the auction output system.

Preferably, the method may include receiving an indication to bid at a particular value before the price of the at least one item in the auction falls to the value specified in the bid. This may allow bids to be submitted and registered into the auction in advance and, optionally, even before the start of the auction, hence giving the auction system more time to process the bids.

Preferably, the method comprises producing auction status information during the course of the auction wherein the information includes at least one of:
the current price of the item;
a list of values of the winning bids.

Preferably, the determination of the at least one final auction winner and the purchase price of the item are independent of an auction output system.

More preferably, the auction status information is output to bidders and auction viewers during the course of the auction. This may allow the auction to be more interactive.

Preferably, indications to bid received and stored before the price of the at least one item in the auction falls to the value specified in the bid may further be incorporated into a live auction output. Hence these bids may be seamlessly incorporated into the auction output as if they were placed "live".

Preferably, in an auction of a plurality of similar items, the purchase price of the at least one item is set at the value of the lowest winning bid.

According to a seventh aspect, the invention provides a method of calculating the purchase price of a plurality of items in a falling price auction comprising:
determining the value of the lowest winning bid;
setting the purchase price for all of the plurality of items to the value of the lowest winning bid.

Preferably, the falling price auction is run according to the method described in the fifth aspect and its preferable features. In a falling price auction with more than one item, this means that all winning bidders may purchase the item at the value of the lowest priced item. This has the advantage that there is less incentive to wait until the last item is available to place a bid, so the load placed on the system when the second-to-last item has been bid for may be reduced.

The invention further provides apparatus for implementing a method according to any of the preceding aspects or their preferred features. The invention also provides any computer program or computer program product comprising instructions for performing a method according to any of the preceding aspects or their preferred features. The invention further provides a data structure produced by a method according to any of the preceding aspects or their preferred features.

An embodiment of the invention will now be described with reference to the accompanying drawings in which.

Figure 1:
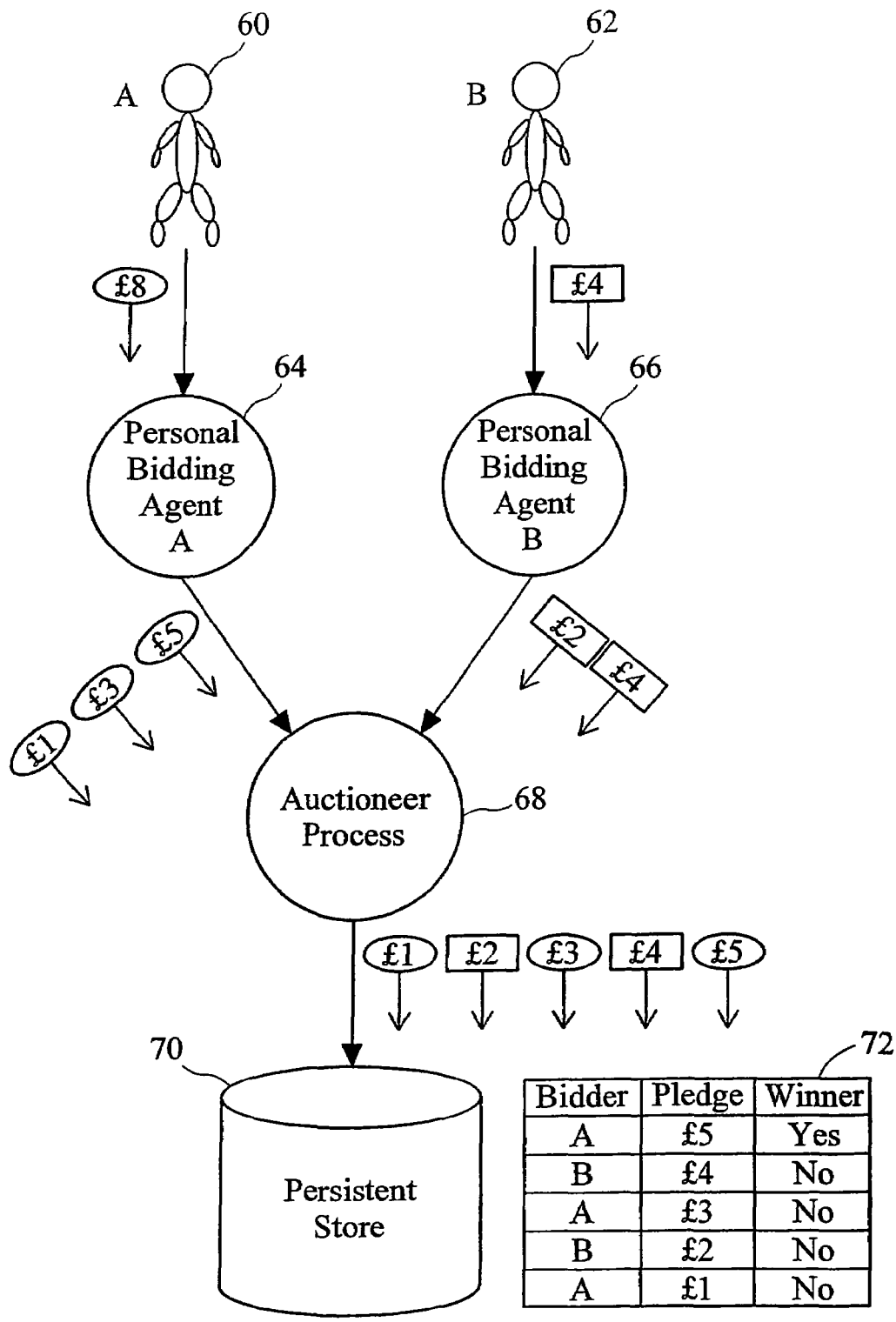
FIG. 1 is a schematic overview of a prior art rising price auction in which personal bidding agents are used.

By way of background, a typical prior art auction system will now be described with reference to FIG. 1 which illustrates the use of personal automatic bidding agents in a rising price auction of one item in which two bids have been placed.

In this embodiment, a first bidder 60 places a maximum price bid of £8 with a first personal bidding agent 64. This is translated by the agent 64 to a bid of £1 and submitted to the auctioneer process.

A second bidder 62 places a maximum bid of £4 with a second personal bidding agent 66. The agent 66 translates this to a bid of £2 to out-bid the £1 bid submitted by the first bidder 60. Each bid is submitted to the auctioneer process 68, processed, and stored in the persistent store 70.

The first bidding agent 64 submits a bid of £3 to move to the winning position. The second agent 66 submits a further bid of £4 to hold the highest bid. The first agent 64 places a bid of £5 and again moves to the winning position.

At this stage, the second bidding agent 66 has reached the predefined limit set by the second bidder 62, so the agent 66 does not place any further bids and the first bidder 60 remains in the winning position.

Since all the bids are stored in the persistent store 70, the winner of the auction and the purchase price of the item can be determined directly from this data. It should be noted, however, that five bids have been processed by the auctioneer process 68 and entered into the persistent store 70 in order to determine the winner of an auction in which there were only two bidders and one item. It may be noted that, in this prior art system, for an auction of a quantity Q of items, for each single bid made, up to Q+1 personal bidding agents could be actively rebidding (multiple times each). Hence use of a conventional personal bidding agents clearly introduces a significant system load.

Another type of prior art auction is the falling price auction, or Dutch auction. In a falling price auction, the price of the item is under the control of the auction engine rather than the bidders. The price starts at a maximum value and drops by a predefined increment periodically, typically with a predefined periodicity. Bidders place their bids when the price of the item has dropped to the amount that they are willing to pay for the item. The bidder purchases the item at the price at which they submitted the bid.

Figure 2:
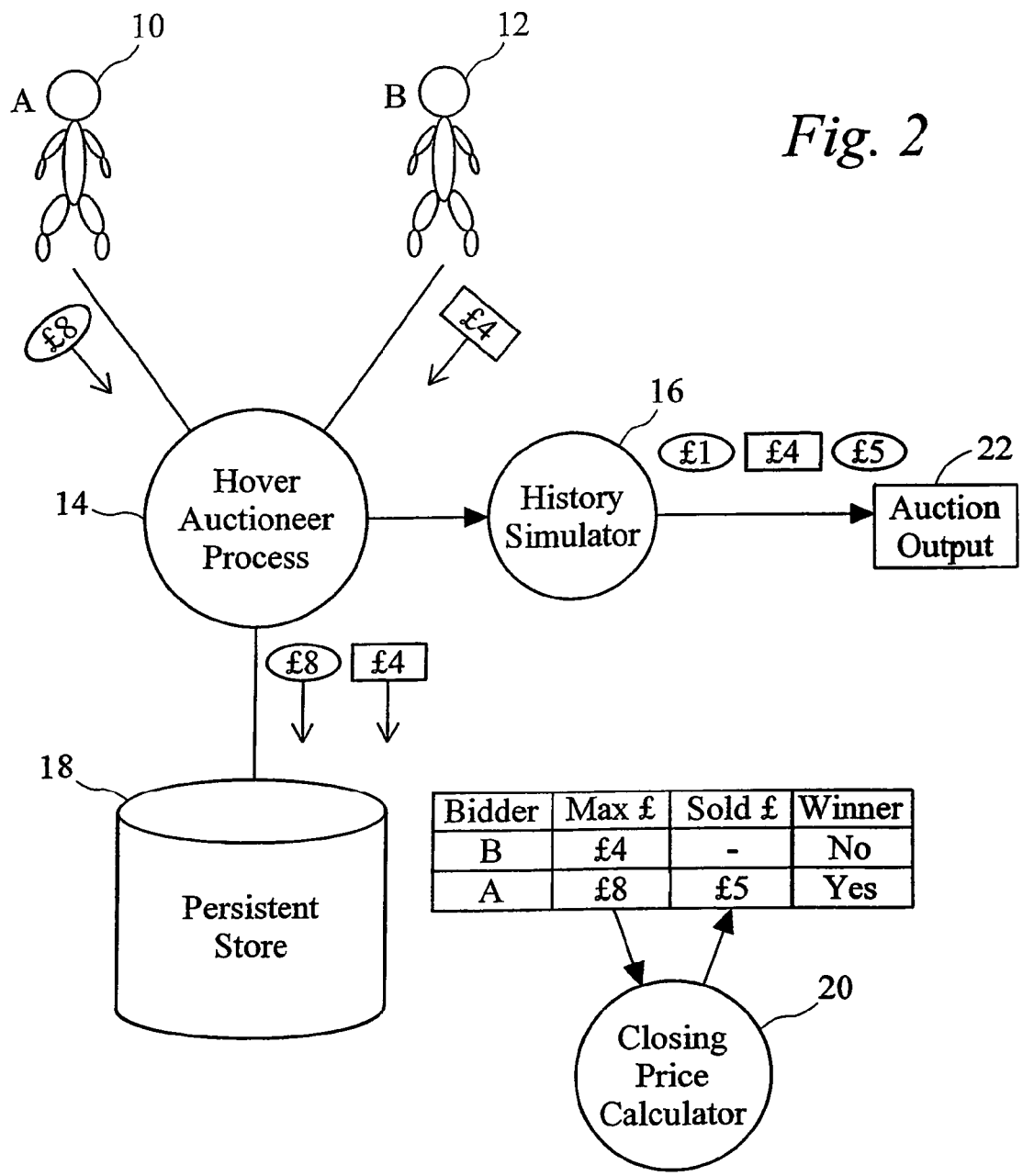
FIG. 2 is a schematic overview of an interactive auction of one item in which one embodiment of the present invention is used.

The main components of one embodiment of the present invention will now be described with reference to FIG. 2. The four main components of this implementation of the interactive auction process are the Hover Auctioneer Process 14, the Persistent Store 18, the History Simulator 16 and the Closing Price Calculator 20.

In this embodiment, two types of bid may be received by the auction system. The first is a fixed price bid which enters the auction output at the fixed price value as soon as it is received. A second type of bid which may be used is a maximum value bid. Either type of bid may be submitted, for example, over a telephone network using, for example, a voice call or SMS message, or may be submitted over the Internet, for example in an e-mail or using a live chat link. Entering a maximum price bid into the auction system is broadly equivalent to using a personal bidding agent, as discussed earlier, to input proxy bids on the bidder's behalf up to a pre-defined maximum amount. However, as will be explained, the embodiment places less load on the system than a conventional bidding agent. In the case of a maximum value bid, the bidder enters a bid at the maximum price they are willing to pay to purchase the item. This bid is entered into the Persistent Store 18 and the History Simulator 16 uses the bid data to enter proxy bids into the Auction Output at values up to the pre-defined maximum amount.

All bids received during the auction undergo two stages of processing. The initial pre-processing step involves attaching a time stamp to each incoming bid and preferably comprises determining whether the bid is a winning bid or not, ideally by reference to a required bid value. The Hover Auctioneer Process 14 passes winning bid information directly to the History Simulator 16 for incorporation into the auction output; hence bids are incorporated into the auction as quickly as possible; rejected bids are stored and can be processed subsequently for analysis. The auction status information can therefore be updated without having to process each bid fully which makes it easier to provide real time status information.

Further processing is then performed on the bid. The value and the time stamp of the bid are passed to the Persistent Store 18, along with an identifier of the bidder. The bidder identifier may be received with the bid itself, for example, it may be a PIN (personal identification number) entered by the bidder on submission of the bid, or it may be the Caller Line Identifier (CLI) number of the bidder's telephone if the bid was made over a telephone network. The Persistent Store 18 stores all the bids received for a particular auction and allows access to this data for the History Simulator 16. Since a time stamp is applied to the bid during pre-processing, the secondary processing may be performed at any time after the bid is received, when the auction system has processing capacity available. The stored information may then be used to provide data regarding the or each auction winner and the purchase price of the or each item auctioned.

The functionality of the Hover Auctioneer Process 14 is outlined below in pseudo-code:

Obtain auction status information comprising current minimum acceptable bid value and current maximum bid amount;
For each incoming bid;
   Attach time stamp to incoming bid;
   Compare value of incoming bid to the current minimum acceptable bid value;
   Is bid value greater than current minimum acceptable bid value?
   Yes=> output bid value to auction history simulator for inclusion into live auction broadcast;
   update auction status information;
   No=> reject bid;
   Send bid value, bidder identifier and bid time stamp data to persistent store.

The main function of the History Simulator 16 is to provide an Auction Output 22 that simulates a live auction, with multiple bids being received in real time from each of a plurality of bidders. Hence the History Simulator 16 provides the visual feedback that would have been produced from the personal bidding agents. The History Simulator 16 may utilise a high-speed dynamic memory buffer, e.g. a ring-buffer, which may preserve only the last few entries of the history and hence limit the amount of data stored by the auction system. The Auction Output 22 may be provided over the Internet. Optionally, it may also be provided over a television network or another medium. The Auction Output 22 may include information such as the minimum acceptable bid for new bidders entering the auction, a list of the present winning bids and information about the at least one item being auctioned (such as the number of units available and the recommended retail price of the item). The History Simulator 16 receives information about new bids from the Hover Auctioneer Process 14. In addition, the Simulator 16 examines the information held in the Persistent Store 18 and incorporates bids into the Auction Output 22 on behalf of bidders with maximum price bids that have values higher than the current minimum acceptable bid. Proxy bids based on maximum price bids stored in the persistent store are entered into the Auction Output 22 at values just higher than the minimum bid amount, based on the bid increment value. It is important to note that the incorporation of proxy bids into the output is a simulated process, independent from the processing of bids. Thus, the system processing bids during the auction need not deal with this large number of proxy bids. Winning proxy bid values can be calculated from the stored bid data at the auction close.

In this embodiment, the current winning bid price and the minimum acceptable bid price are based on the Auction Output data produced by the History Simulator 16 and not on the data stored in the Persistent Store 18. This means, for example, that if, in an auction of one item, a fixed price bid is entered at £5 and a second maximum price bid is entered at £10, the History Simulator 16 would enter a proxy bid on behalf of the maximum value bidder dependent on the auction increment value, for example, a £6 bid would be entered into an auction in which the auction increment was £1. Then the current winning bid price would be displayed at £6 and the minimum acceptable bid price would be displayed at £7, even though the Persistent Store 18 potentially contains a £10 bid.

In this embodiment, it is noted that the Auction Output 22 produced by the History Simulator 16 will depend on the frequency with which the History Simulator 16 consults the data in the Persistent Store. If the frequency is high in comparison to receipt of real bids, then more intermediate proxy bids may be entered into the Auction Output 22 for each maximum price bid in the Persistent Store 18 than if the frequency is low (for example if several real bids are received between updates). However, the at least one final auction winner and the purchase price of the at least one item are determined from the data in the persistent store and so, surprisingly, this can function adequately as the Auction Output does not affect the price and the bidder identity corresponding to the winning bid. The winning bidders can be determined by an objective algorithm and are not affected by artefacts of the mechanism for processing bids. It should be noted, however, that the simulated history moves immediately to the steady-state outcome after a bid is placed.

An outline of the operation of the History Simulator 16 is given below:
Obtain new incoming bid information;
Is bid a maximum value bid?
Yes=> Add bid into auction with a value of one auction increment above current minimum acceptable bid price (if this is below the maximum-value of the bid);
No=> Add bid into auction at the fixed price value;
Update list of winning bids;
Update value of minimum acceptable bid and current maximum bid;
At regular time intervals throughout the auction;
  Examine persistent store data for bids with values greater than the minimum acceptable bid.

At the end of the auction, the Closing Price Calculator 20 determines the at least one winner of the auction and the purchase price of the at least one item using the data stored in the Persistent Store 18; hence winners of an auction may be determined by the time and the maximum price of their bid alone. The bidder identifier of the at least one winning bidder is determined from the maximum bid value data and the values of the fixed price bids stored in the Persistent Store 18. If there is more than one bid with a particular value, then the time stamps can be used to determine which bid is the winning (preferably the earliest) bid. The time stamp assigned to a maximum value bid corresponds to the time at which the initial maximum value bid was received, not the time at which a winning proxy bid was entered. If there is a number (n) of identical items in the auction (where "n" is a number greater than or equal to one), then the auction winners will be a number (n) of bidders holding the number (n) of earliest highest bids. In this embodiment, all bids are prioritised so that, if there is at least one maximum price bidder and at least one fixed price bidder with bids of the same value, then the fixed price bidder will win against the maximum price bidder even if (as will typically be the case) the fixed price bid was entered later than the maximum price bid. This is because a proxy bid would only be entered in response to a real bid and, if the real bid is at the limit of the proxy bid, a further bid would not be made.

The Closing Price Calculator 20 then sets the purchase price for the at least one item in the auction. The purchase price for any winning bidder who entered a fixed price bid is set at the value of that bidder's winning fixed price bid. For bidders who entered maximum value bids, the Closing Price Calculator 20 sets the purchase price by examining the value of the highest losing bid in the auction (the next earliest highest bid after the lowest winning bid) and comparing it to the lowest winning bid. If the highest losing bid has the same value as the lowest winning bid, then the purchase price is set at the value of the lowest winning bid. If the highest losing bid has a value lower than that of the lowest winning bid, then the purchase price is set at one bid increment above the highest losing bid.

The pseudo-code below outlines the basic functionality of the Closing Price Calculator 20:
Obtain auction bidding data from persistent store;
For an auction of "n" items, rank bids in order of value to determine "n" highest value bids;
If one or more fixed price bids and one or more maximum value bids have a particular value, then rank all fixed price bids of that value above all maximum value bids of that value;
If more than one bid of one type has a particular value, then rank those bids in order of how early they were received;
Identify the "n" highest earliest bidders as winning bidders;
Determine the value of the highest losing bid;
Does the highest losing bid have the same value as the lowest winning bid?
Yes=> set the purchase price of the item for all winning maximum value bids to the value of the highest losing bid;
No=> set the purchase price of the item for all winning maximum value bids to one bid increment higher than the highest losing bid;
For all fixed price bids, set the purchase price of the item to the value of the fixed price bid.

An example of how a typical auction might operate according to one embodiment of the present invention will now be described with reference to FIG. 2. In this example, there is only one item available for sale at the auction.

A first bidder 10 inputs a bid with a maximum value of £8 to the Hover Auctioneer Process 14 which attaches a time stamp to the bid. The history simulator 16 determines whether the bid is higher than the minimum acceptable bid. If so, the new bid is incorporated into the auction output 22 by displaying a bid at one auction increment higher than the minimum acceptable bid. The history simulator 16 updates the value of the winning bid and the minimum acceptable bid. The bid of the first bidder 10 is transferred to the persistent store 18, where the bid value is stored along with an identifier of the first bidder 10 and the time stamp of the bid.

A second bidder 12 then submits a fixed bid of £4 over a second input channel, for example by telephone. This bid is entered into the auction output 22 by the history simulator 16. The value of the winning bid is increased to £4 and the new minimum acceptable bid is displayed at £5. By examining the data in the persistent store database 18, the history simulator 16 can determine that the first bidder 10 would be willing to pay up to £8 for the item. The simulator 16 therefore enters a bid of £5 into the auction output on behalf of the first bidder 10 without the first bidder 10 themselves, or an agent acting on behalf of the first bidder, having to enter a new bid into the process. The Hover Auctioneer Process 14 does not record the bid, nor is it stored.

When the auction closes, the winner is determined from the data stored in the persistent store 18. Using this data, the closing price calculator 20 can set the purchase price of the item at one bid increment (£1) above the next highest bid (i.e. the highest losing bid of £4) to give the correct result (£5).

It should be noted that, in this example, only two records of bid data need to be transferred to the persistent store in comparison with the multiple records that were transferred in the conventional auction system.

Figure 3:
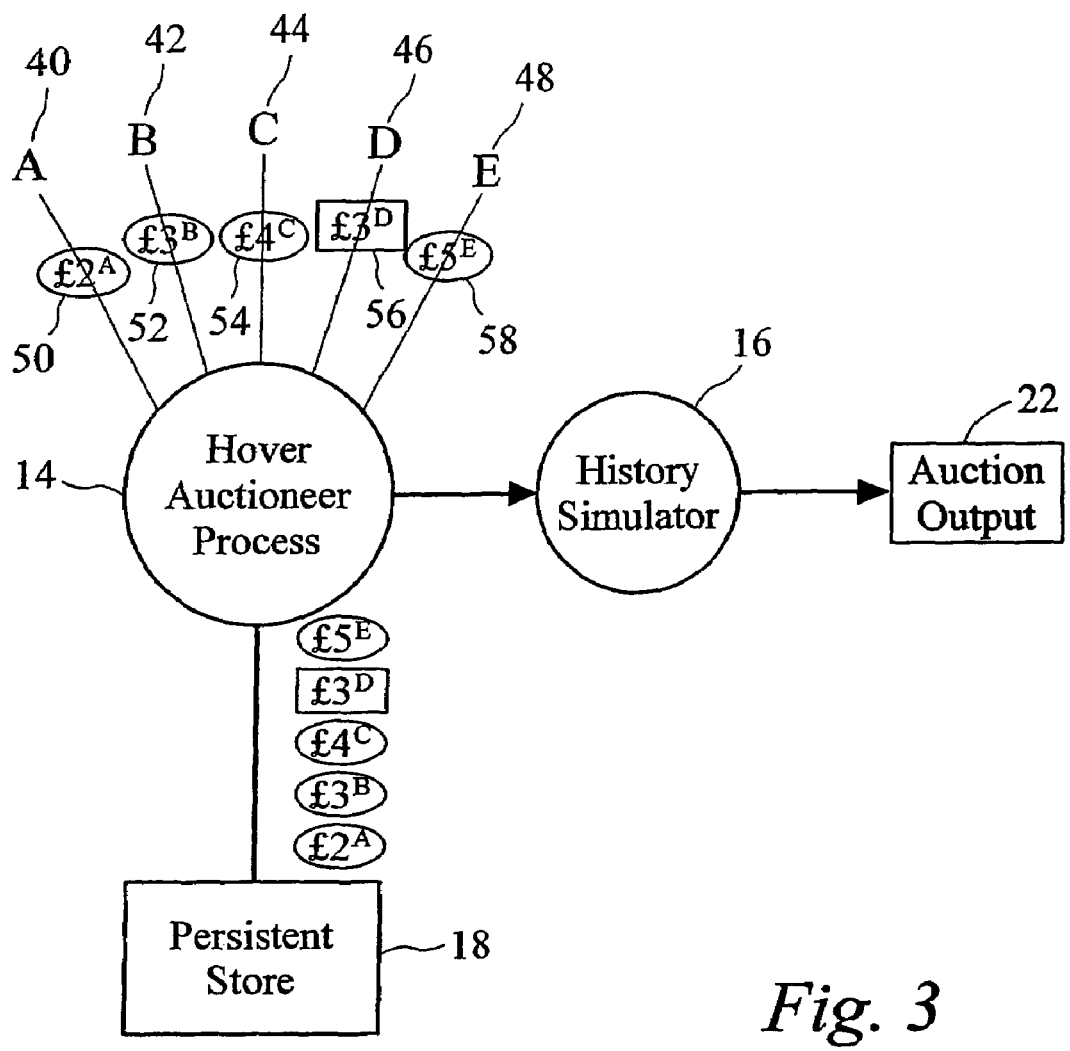
FIG. 3 is a schematic overview of an interactive auction in which there is more than one identical item available.
Figure 4:
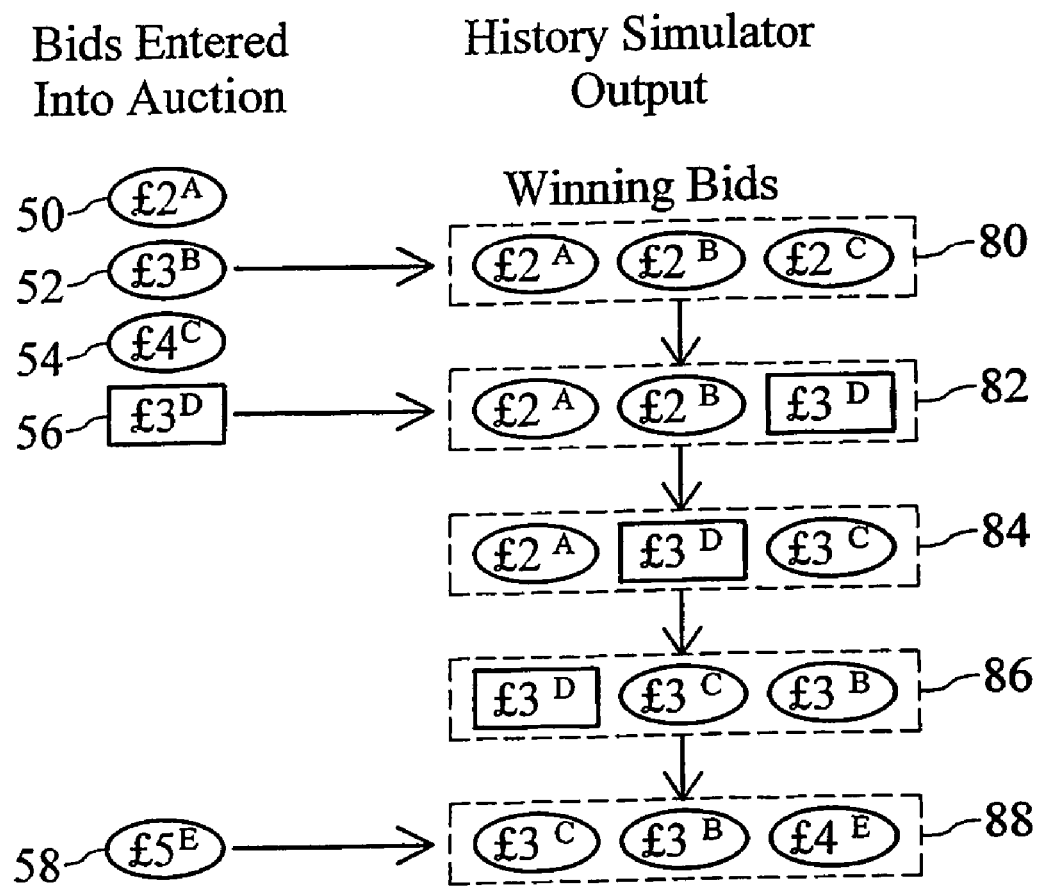
FIG. 4 is a flow chart showing the history simulator output for the interactive auction shown in FIG. 3.

A second example of how an embodiment of the present invention might operate is given in FIGS. 3 and 4. This example illustrates the situation in which there is more than one item available in the auction. In this example there are three identical items, so three bidders must be identified as winners both during the auction and at the auction close. In this case, the reserve price of the items is £2 and the auction increment is £1.

The first three bids received during the auction (in this case, the bids of bidders A, B and C; 50, 52 and 54) are displayed by the history simulator 16 as winning bids 80, providing their values are greater than or equal to the reserve price of the item. The three winning bids 80 are all displayed at the value of the minimum acceptable bid, i.e. the bids are all displayed at £2 in this case.

The minimum acceptable bid price is then set at one auction increment above the lowest winning bid. In this example, the lowest winning bid is £2, so the minimum acceptable bid price would be set at £3.

Bidder D then inputs a fixed price bid 56 with a value of £3. This bid may be input over a different medium, for example over the telephone network. This is entered into the persistent store and is displayed by the history simulator 16 at as a winning bid 82 at the fixed price of £3. Bidder D becomes a winner, replacing Bidder C since Bidder C holds the most recently received lowest value bid.

The history simulator 16 examines the data stored in the persistent store 18 however, to discover that Bidder C is willing to pay up to a maximum of £4 for the item in the auction. The simulator inputs a bid on behalf of Bidder C at the value of the minimum acceptable bid of £3. Bidder C replaces Bidder B, the holder of the most recent lowest bid and the updated winners list 84 comprises Bidders A, D and C.

The history simulator 16 again consults the data in the persistent store 18 and finds that Bidder B is willing to pay up to a maximum value of £3 for the item. The simulator inputs a bid of £3 on behalf of Bidder B, replacing Bidder A with Bidder B in the list of winners 86.

The minimum acceptable bid value is increased to £4, since all of the winning bids are at £3.

Finally, Bidder E inputs a bid 58 with a maximum value of £5. This data is stored in the persistent store 18 and the history simulator 16 enters a bid of £4 (at the value of the minimum acceptable bid) on behalf of Bidder E. Bidder E replaces Bidder D on the list of winners 88 since Bidder D entered the most recent lowest bid.

If the auction then ends, the winners are again determined independently by the closing price calculator 20 using the data in the persistent store 18. The three winners are identified as the three bidders with the earliest highest bids, in this case Bidders B, C and E.

The purchase price of the item for all of the winners is set at one auction increment higher than the value of the highest losing bid (i.e. the next highest earliest bid after the winning bids).

As stated above, these descriptions of possible embodiments only provide examples of the operation of the auction system. The example of an auction with three items available can easily be generalised to cases where there is any number of items ("n" items).

Figure 5:
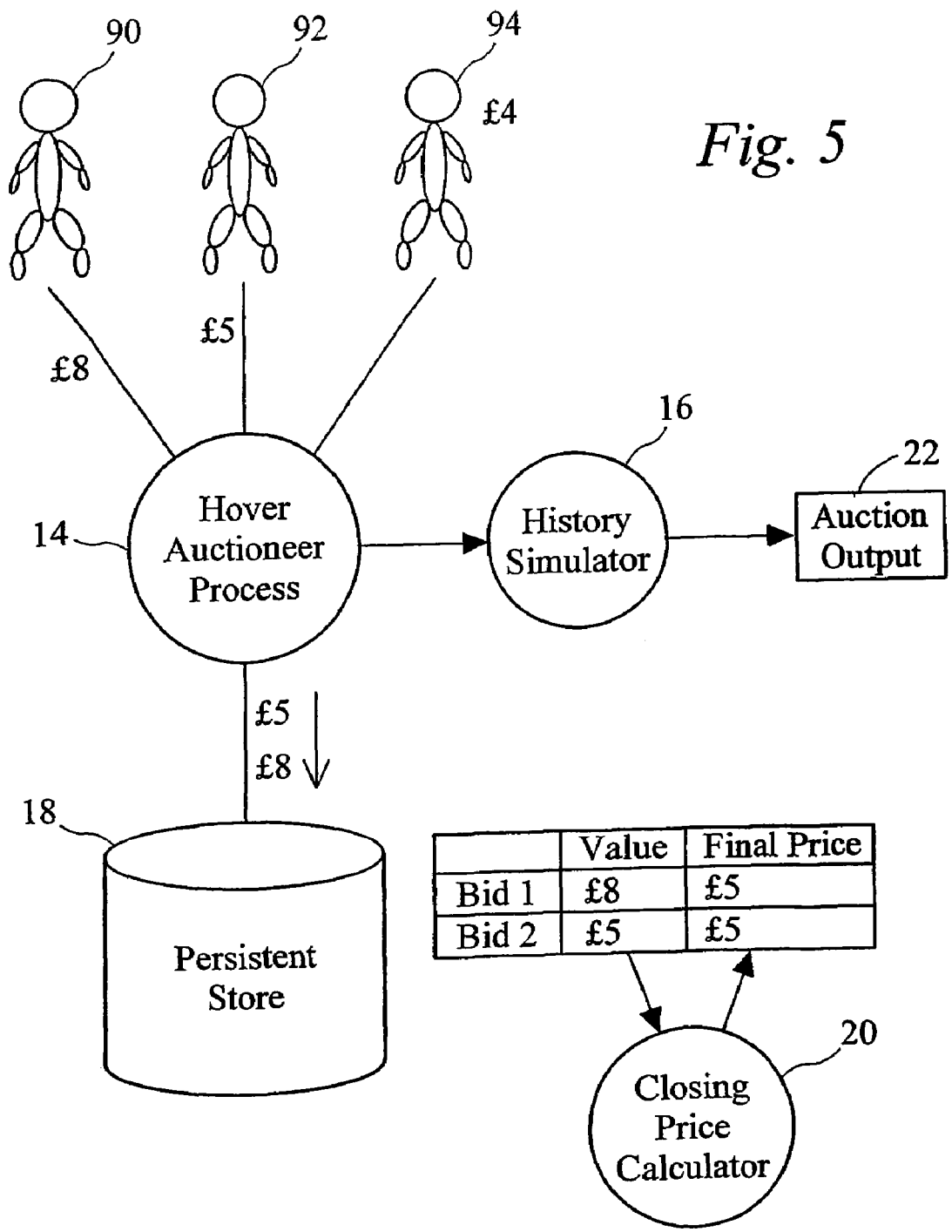
FIG. 5 depicts a falling price auction.

A third example of the operation of one embodiment of the invention will now be described with reference to FIG. 5 which illustrates a falling price auction with two items and three bidders. The initial item price is £10 and the amount drops by £1 every 2 minutes.

After four minutes the price of each of the items has dropped to £8. The first bidder 90 submits a bid to the Hover Auctioneer Process 14. The History Simulator 16 updates the status information in the Auction Output 22 to show that one of the two items has been taken and that there is only one remaining item available. The bid data is then transferred to the Persistent Store 18 where the bidder identifier (which may be a PIN of a registered user or the CLI number of the user's telephone) is stored along with the value of the bid.

No further bids are received until the price of the item in the auction falls to £5. At this value, a second bidder 92 registers a bid. This can either be done interactively by the second bidder 92, or it may be done through a maximum price bid entered into the Hover Auctioneer Process 14 before the start of the auction or before the price of the item reaches £5. The maximum price bid would be stored, along with a bidder identity, in the Persistent Store 18 until the price of the auction item drops to £5. At this point, the History Simulator 16 would take the bid details and incorporate them into the auction to show that the second item had been bid for at a value of £5.

Since there are only two items available in the auction, the second bid ends the auction. The bid of the third bidder 94 is not submitted into the auction output since the auction has ended before the price of the item drops to £4.

As in the rising price auction, when there is more than one indication to bid at a particular value, priority may be given to indications to bid received "live" during the auction. Alternatively, it may be preferable in some instances to give priority to stored indications to bid, received before the start of the auction, or before the price of the item falls to the specified value.

The Closing Price Calculator 20 uses the data in the persistent store to determine the auction winners and the purchase price. The two highest bids in the Persistent Store 18 win the two available items. If there is more than one bid with a particular value then the earlier bid(s) win. If there is more than one item in the auction, the purchase price for the item may be set at the value of the lowest bid received. In this case, the value of the lowest bid received is £5, so the closing price calculator 20 sets the purchase price of the item to £5 for both of the winning bidders.

Modifications may be made to this system and features may be provided independently of other features or in other combinations unless otherwise stated.

What is claimed is:

1. A method of data processing for processing bids in an auction, the auction having a live phase during which bids are accepted and an auction close following which bids are no longer accepted, comprising:
   receiving at least one bid for an item in an auction;
   assigning a time stamp to each bid received;
   storing data comprising a bidder identity, the time stamps, and a bid amount for each bid;
   pre-processing each bid to obtain auction status information during the live phase of the auction;
   subsequently processing the stored data to determine at least one winning bidder, wherein at least one of the bids received is designated as a maximum value bid, the maximum value bid specifying a maximum purchase price for an item and wherein a bid value for the maximum value bid is determined in response to other bids, and wherein pre-processing each bid further comprises simulating a bid value for at least one maximum value bit; and providing as a live auction output at least one simulated proxy bid for at least one bidder having a designated maximum bid value at a value lower than the stored maximum value of the bidder's bid.

2. A method according to claim 1 wherein at least a portion of the subsequent processing is carried out after the auction close.

3. A method according to claim 1 wherein the information includes at least one of:

a minimum required bid amount;

a current maximum bid amount;

a value or values for each winning bid.

4. A method according to claim 3 wherein the auction status information is further incorporated into an auction output.

5. A method according to claim 1 wherein a plurality of winning bidders is identified.

6. A method according to claim 1 wherein pre-processing a received bid comprises: determining whether the value of the received bid makes it a winning bid, preferably based on a minimum required bid amount and; updating the auction status information in dependence on the determination.

7. A method according to claim 1 wherein data for each bid is output to a persistent store or database that holds information relating to all the bids for a particular auction.

8. A method according to claim 7 wherein at least part of the outputting is performed in the subsequent processing stage.

9. A method according to claim 1 wherein the maximum bid value is stored, but simulated proxy bids generated for the maximum value bid are not all stored.

10. A method according to claim 9 wherein only the maximum value bid is stored.

11. A method according to claim 1 wherein the pre-processing step is performed without determining the bid value for at least one maximum value bid.

12. A method according to claim 1 wherein the subsequent processing step comprises assigning bid values to all winning maximum value bids, optionally, to all maximum value bids.

13. A method according to claim 1 wherein the maximum value bids are processed in accordance with a predetermined algorithm.

14. A method according to claim 13 wherein the predetermined algorithm includes at least one rule for distinguishing between equal value bids based on at least one objective criterion.

15. A method according to claim 1 wherein fixed price bids are processed at a higher priority than maximum value bids.

16. A method according to claim 1 wherein maximum value bids received earlier are processed preferentially compared to maximum value bids received later.

17. A method according to claim 1 wherein, for an auction having a first plurality (n) of sale items and a second plurality (m) of valid maximum value bids with maximum values greater than a current minimum acceptable bid, a required bid value for an incoming bid is determined based on the number of sale items remaining (n−m) after disregarding the number (m) corresponding to said second plurality of maximum value bids.

18. A method according to claim 17 wherein, if the number (1) of received maximum value bids is greater than the number (n) of sale items, pre processing includes setting a minimum valid bid value and rejecting excess maximum value bids to leave a number (m*) of valid maximum value bids at most equal to the number (n) of sale items.

19. A method according to claim 1 wherein at least one bid is received over the Internet.

20. A method according to claim 19 wherein the bidder identifier used is a predefined Personal Identification number (PIN) entered by the bidder upon submitting the bid.

21. A method according to claim 1 wherein at least one bid is received over a telephone network.

22. A method according to claim 21 wherein the bidder identifier is the Caller Line Identifier(CLI).

23. A method according to claim 1 wherein at least one bid is received over a first input channel and at least one bid is received over a second input channel.

24. A method according to claim 23 wherein the time stamps for the at least one bid received over the first channel and the at least one bid received over the second channel are correlated.

25. A method according to claim 1 wherein the bidders are pre registered users.

26. A method according to claim 1 wherein the maximum value of the maximum value bid is stored in a database of bids for use in determining a winner, but simulated proxy bid values generated for said maximum value bid are not all stored in the database.

27. A method according to claim 26 wherein only the maximum value of the maximum value bid is stored in the database.

28. A method according to claim 1 wherein the bid data is obtained from a persistent store that stores data.

29. A method according to claim 1 wherein the auction output includes auction status information which comprises at least one of:

the maximum bid amount;

the minimum acceptable bid;

the value of the at least one winning bid.

30. A method according to claim 29 wherein the initial minimum acceptable bid amount is set to the reserve price of the at least one auction item.

31. A method according to claim 29 wherein proxy bids are inserted into the auction output until the reserve price of the at least one auction item is reached.

32. A method according to claim 1 wherein, in an auction of a given number (n) of items, the value of the at least one current winning bid is determined by examining the database for the given number (n) of earliest highest bid (s).

33. A method according to claim 32 further comprising displaying any of the given number (n) of earliest highest bid(s) that are maximum value bids as the current winning bid(s) at the value of one auction increment above the value of the current minimum acceptable bid.

34. A method according to claim 1 further comprising setting a minimum acceptable bid price for each item, as the auction progresses, to one bid increment above the value of the current lowest winning bid.

35. A method according to claim 1 wherein the simulated bidding is broadcast over at least one medium.

36. A method according to claim 35 wherein the at least one medium is the Internet.

37. A method according to claim 1 wherein the simulated bidding is broadcast over two media with mutually different input/output interfaces.

38. A method according to claim 1 further comprising updating the value of each current winning bid and updating the minimum acceptable bid price according to further data received during the auction.

39. A method according to claim 1 further comprising updating the value of each current winning bid and updating the minimum acceptable bid price according to data stored in a persistent store.

40. A data processing method for determining the purchase price of at least one item in an auction, the method comprising:
  determining a price of at least one item purchased in the auction, following closing of the auction, using stored bid data;
  identifying at least one winning bidder from data stored in a database;
  identifying a highest losing bid in the auction;
  identifying a lowest winning bid in the auction;
  setting a purchase price for a bidder who entered a maximum value bid for the at least one item based on a value of the highest losing bid;
  determining whether the value of the highest losing bid is equal to a value of the lowest winning bid;
  setting the purchase price for a bidder who entered a maximum value bid for the at least one item to the value of the highest losing bid if the highest losing bid has the same value as the lowest winning bid; and
  setting the purchase price for a bidder who entered a maximum value bid for the at least one item to one auction increment higher than the value of the highest losing bid if the highest losing bid has a value lower than that of the lowest winning bid.

41. A method according to claim 40 wherein the bid data is obtained from a persistent store that stores.

42. A method according to claim 40 wherein the process of determining the final winner operates independently of a process providing auction output during the auction.

43. A method according to claim 40 wherein the value of at least one bid stored is set at the maximum purchase price acceptable to the bidder.

44. A method according to claim 43 wherein the purchase price of the at least one item is determined without first determining the values of intermediate proxy bids entered on behalf of bidders who submit bids.

45. A method according to claim 40 wherein the stored bid data comprises a stored bid value and time stamp data for each bid and wherein the stored bid value and time stamp data for each bid are used to identify the at least one earliest highest bid and hence determine the at least one winner of the auction.

46. A method according to claim 40 wherein the stored bid data comprise a stored bid value and time stamp data for each bid and wherein the bid value and time stamp data for each bid is used to identify the highest losing bid in the auction.

47. A method according to claim 40 wherein the purchase price for any winning bidder who input a fixed price bid is set at the value of the fixed price bid.

48. A computer treadable medium comprising instructions for processing bids in an auction, the auction having a live phase during which bids are accepted and an auction close following which bids are no longer accepted, comprising:
  instructions for receiving at least one bid for an item in an auction;
  instructions for assigning a time stamp to each bid received;
  instructions for storing data comprising a bidder identity, the time stamp, and a bid amount for each bid;
  instructions for pre-processing each bid to obtain auction status information during the live phase of the auction;
  instructions for subsequently processing the stored data to determine at least one winning bidder, wherein at least one of the bids received is designated a maximum value bid, the maximum value bid specifying a maximum purchase price for an item and wherein a bid value for the maximum value bid is determined in response to other bids, and wherein the instructions for pre-processing each bid further comprise instructions for simulating a bid value for at least one maximum value bid; and
  providing as live auction output at least one simulated proxy bid for at least one bidder having a designated maximum bid value at a value lower than the stored maximum value of the bidder's bid.

49. Apparatus for processing bids in an auction, the auction having a live phase during which bids are accepted and an auction close following which bids are no longer accepted, comprising:
  means for receiving at least one bid for an item in an auction;
  means for assigning a time stamp to each bid received;
  means for storing data comprising a bidder identity, the time stamp, and a bid amount for each bid;
  means for pre-processing each bid to obtain auction status information during the live phase of the auction;
  means for subsequently processing the stored data to determine at least one winning bidder, wherein at least one of the bids received is designated as a maximum value bid, the maximum value bid specifying a maximum purchase price for an item and wherein a bid value for the maximum value bid is determined in response to other bids, and wherein the means for pre-processing each bid further comprises means for simulating a bid value for at least one maximum value bid; and
  means for providing as a live auction output at least one simulated proxy bid for at least one bidder having a designated maximum bid value at a value lower than the stored maximum value of the bidder's bid.

50. A method of data processing for processing bids in an auction, the auction having a live phase during which bids are accepted and an auction close following which bids are no longer accepted, the method comprising:
  receiving at least one bid for an item in an auction;
  assigning a time stamp to each bid received;
  storing data comprising a bidder identity, the time stamp, and a bid amount for each bid;
  pre-processing each bid to obtain auction status information during the live phase of the auction;
  subsequently processing the stored data to determine at least one winning bidder,
  wherein at least one of the bids received is designated as a maximum value bid, the maximum value bid specifying a maximum purchase price for an item and wherein a bid value for the maximum value bid is determined in response to other bids,
  wherein pre-processing each bid further comprises simulating a bid value for at least one maximum value bid,
  wherein an auction output includes auction status information which comprises at least one of the maximum bid amount, the minimum acceptable bid, and the value of the at least one winning bid, and
  wherein proxy bids are inserted into the auction output until a reserved price of the at least one auction item is reached.

51. A method of data processing for processing bids in an auction, the auction having a live phase during which bids are accepted and an auction close following which bids are no longer accepted, the method comprising:

receiving at least one bid for an item in an auction;

assigning a time stamp to each bid received;

storing data comprising a bidder identity, the time stamp, and a bid amount for each bid;

pre-processing each bid to obtain auction status information during the live phase of the auction;

subsequently processing the stored data to determine at least one winning bidder, wherein at least one of the bids received is designated a maximum value bid, the maximum value bid specifying a maximum purchase price for an item and wherein a bid value for the maximum value bid is determined in response to other bids, wherein pre-processing each bid further comprises simulating a bid value for at least one maximum value bid, and wherein, in an auction of a given number (n) of items, a value of at least one current winning bid is determined by examining a database for the given number (n) of earliest highest bid(s); and displaying any of the given number (n) of earliest highest bid(s) that are maximum value bids as the current winning bid(s) at a value of one auction increment above a value of a current minimum acceptable bid.

* * * * *